(12) United States Patent
Eberhard et al.

(10) Patent No.: US 8,932,741 B2
(45) Date of Patent: Jan. 13, 2015

(54) CONDUCTOR PLATE FOR A VEHICLE BATTERY MODULE

(75) Inventors: Martin Eberhard, Woodside, CA (US); Rob Sweney, San Francisco, CA (US); Tobias Steiner, Isenbüttel (DE)

(73) Assignees: Volkswagen AG, Wolfsburg (DE); Audi AG, Ingolstadt (DE)

( * ) Notice: Subject to any disclaimer, the term of this patent is extended or adjusted under 35 U.S.C. 154(b) by 894 days.

(21) Appl. No.: 13/009,560

(22) Filed: Jan. 19, 2011

(65) Prior Publication Data

US 2012/0141852 A1 Jun. 7, 2012

Related U.S. Application Data

(60) Provisional application No. 61/420,542, filed on Dec. 7, 2010.

(51) Int. Cl.

| H01M 2/10 | (2006.01) |
|---|---|
| H01M 2/20 | (2006.01) |
| H01M 2/34 | (2006.01) |
| H01M 10/613 | (2014.01) |
| H01M 10/625 | (2014.01) |
| H01M 10/643 | (2014.01) |
| H01M 10/653 | (2014.01) |
| H01M 10/6554 | (2014.01) |

(52) U.S. Cl.
CPC .......... *H01M 2/1077* (2013.01); *H01M 2/206* (2013.01); *H01M 2/34* (2013.01); *H01M 10/5004* (2013.01); *H01M 10/5016* (2013.01); *H01M 10/503* (2013.01); *H01M 10/504* (2013.01); *H01M 10/5053* (2013.01); *H01M 2200/103* (2013.01)

USPC .......................................................... 429/99

(58) Field of Classification Search
CPC ........................... H01M 2/1077; H01M 2/206
USPC ....................................................... 429/98, 99
See application file for complete search history.

(56) References Cited

U.S. PATENT DOCUMENTS

| 7,671,565 | B2 | 3/2010 | Straubel et al. | |
|---|---|---|---|---|
| 8,394,525 | B2* | 3/2013 | Maguire et al. | 429/157 |
| 8,409,743 | B2* | 4/2013 | Okada et al. | 429/120 |
| 8,475,951 | B2* | 7/2013 | Ueshima et al. | 429/120 |
| 2012/0009447 | A1* | 1/2012 | Ikeda et al. | 429/90 |
| 2012/0141853 | A1* | 6/2012 | Eberhard et al. | 429/98 |

\* cited by examiner

*Primary Examiner* — Stewart Fraser
(74) *Attorney, Agent, or Firm* — Kenyon & Kenyon LLP (57) ABSTRACT

In a conductor plate for a vehicle battery module, the vehicle battery module is adapted to accommodate a plurality of longitudinal battery cells. The battery cells are arranged in parallel with respect to their longitudinal axes, and each battery cell has a first end and an opposite second end with respect to its longitudinal axis. The conductor plate includes: a base part; and a plurality of longitudinal members. Each of the plurality of longitudinal members includes a first end and a second end, the first ends of the longitudinal members being connected to the base part, the base part and the plurality of longitudinal members being substantially arranged in a common plane. The longitudinal members are arranged spaced from each other such that an interval between two of the plurality of longitudinal members matches to an interval between two rows of the battery cells.

12 Claims, 9 Drawing Sheets

CONDUCTOR PLATE FOR A VEHICLE BATTERY MODULE

CROSS-REFERENCE TO RELATED APPLICATIONS

The present application claims the benefit of U.S. Provisional Patent Application Ser. No. 61/420,542, filed on Dec. 7, 2010, which is expressly incorporated herein in its entirety by reference thereto.

FIELD OF THE INVENTION

The present invention relates to a conductor plate for a vehicle battery module, and to a vehicle battery module or vehicle battery packaging for use in an electric vehicle with an electrical engine driving the vehicle.

SUMMARY

According to example embodiments, a conductor plate for a vehicle battery module is provided. The vehicle battery module is adapted to accommodate a plurality of longitudinal battery cells. The battery cells are arranged in parallel with respect to their longitudinal axes and each battery cell has a first end and an opposite second end with respect to its longitudinal axis. The conductor plate includes a base part and a plurality of longitudinal members. Each of the plurality of longitudinal members includes a first end and a second end, and the first ends of the longitudinal members are connected to the base part. The base part and the plurality of longitudinal members are substantially arranged in a common plane. The longitudinal members are arranged spaced from each other such that an interval between two of the plurality of longitudinal members matches to an interval between two rows of the battery cells.

According to example embodiments, a vehicle battery module for accommodating a plurality of longitudinal battery cells is provided. The battery cells are arranged in parallel with respect to their longitudinal axes and each battery cell has a first end and an opposite second end with respect to its longitudinal axis. The vehicle battery module includes a conductor plate which is adapted to electrically couple the first ends of the battery cells. The conductor plate includes a base part and a plurality of longitudinal members. Each of the plurality of longitudinal members includes a first end and a second end. The first ends of the longitudinal members are connected to the base part. The base part and the plurality of longitudinal members are substantially arranged in a common plane. The longitudinal members are arranged spaced from each other such that an interval between two of the plurality of longitudinal members matches to an interval between two rows of the battery cells.

Although certain features described in the above summary and the following detailed description are described in connection with particular example embodiments, it is to be understood that the features described herein can be combined with each other unless it is noted otherwise.

Further features and aspects of example embodiments of the present invention are described in more detail below with reference to the appended Figures.

DETAILED DESCRIPTION

In the following, exemplary embodiments of the present invention will be described in more detail. It is to be understood that the following description is given only for the purpose of illustration and is not to be taken in a limiting sense.

It is to be understood that in the following description of the example embodiments, any direct connection or coupling between devices, components or other physical units shown in the drawings or described herein could also be implemented in an indirect connection or coupling. Same reference signs in the various instances of the drawings refer to similar or identical components. Furthermore, it is to be understood that the features of the various exemplary embodiments described herein may be combined with each other unless specifically noted otherwise.

Electric vehicles or hybrid vehicles including at least one electrical engine for driving the vehicle are provided with large vehicle battery packs or vehicle battery modules for storing and providing electrical energy for the electrical engine. The battery module may include several hundred up to several thousands of battery cells, or may include several smaller battery modules each including a plurality of battery cells, e.g., up to 50 or 100 battery cells. In each smaller battery module, the battery cells may be connected in parallel and the smaller battery modules may be electrically combined in a parallel or serial connection to provide as a whole the required electrical voltage and current.

There are many functional requirements for a vehicle battery module, some of which are very difficult to accomplish in unison. These functional requirements include, e.g., a high energy density, a low number of components for producing the battery module, and a low total weight of the battery module. Additionally, many functional requirements for operating the vehicle battery module have to be considered, as will be explained in the following.

In high power applications it is important to have a minimal power loss in electrical connections. Therefore, each battery cell must have a reliable electrical connection to a battery circuit on its positive and negative connectors. Furthermore, the battery module and the electrical connections must withstand standard automotive operating conditions for the life of the vehicle. Therefore, requirements concerning robustness and structural longevity must be fulfilled. During operation of the battery module a catastrophic event, e.g., extreme heat or foreign object penetration, may cause a battery cell to go into a so-called "thermal runaway" which means a rapid exothermic reaction that can briefly produce lots of heat. Flame and hot gases are exhausted from vent holes around the positive cap of the battery cell and the battery cell itself becomes hot. The thermal runaway of one battery cell may trigger a thermal runaway of other battery cells nearby if the nearby battery cell absorbs enough heat from the first battery cell. This may start a chain reaction called "cell propagation." Therefore, it is desirable that a battery module configuration will survive a thermal runaway of a single cell and prevent cell propagation.

The terms battery module, battery pack, and battery packaging are used synonymously. A battery module includes a plurality of longitudinal battery cells arranged and electrically coupled in parallel in a so-called "p-group." Furthermore, the battery module may include several p-groups in a serial or parallel connection.

According to example embodiments of the present invention, a connector plate for a vehicle battery module is provided. The vehicle battery module is configured to accommodate a plurality of longitudinal battery cells. The battery cells are arranged in the vehicle battery module in parallel with respect to their longitudinal access. Each battery cell has a first end and an opposite second end with respect to its longitudinal access. The battery cells may be arranged in a matrix in rows. The conductor plate includes a base part and a plurality of longitudinal members. Each of the plurality of longitudinal members includes a first end and a second end. The first end of the longitudinal members are connected to the base part. The base part and the plurality of longitudinal members are substantially arranged in a common plane. Thus, the plurality of longitudinal members may look like fingers extending from the base part. The longitudinal members are arranged spaced from each other such that an interval between two of the longitudinal members matches to an interval between two rows of battery cells in the battery module. The longitudinal members may be arranged in parallel with a spacing between the longitudinal members matching to a spacing between parallel rows of battery cells.

The base part and the plurality of longitudinal members may be integrally formed of an electrically conducting metal. Each longitudinal member may include a plurality of tabs, each of which extends from the corresponding longitudinal member in the common plane and in a direction perpendicular to a direction from the first end to the second end of the corresponding longitudinal member. The tabs of one longitudinal member are arranged in an interval matching to an interval of the battery cells within one of the rows of battery cells. The tabs may be used for electrically connecting ends of the battery cells to the longitudinal member. Therefore, the tabs are extending from the longitudinal member into the direction of a corresponding battery cell and thus a short wire bond is sufficient for connecting the battery cell to the tab. The interval between two longitudinal members may be selected such that a bonding tool for attaching the bond wire to the tabs and the ends of the battery cells can be used.

According to example embodiments, a thickness of the longitudinal member in a direction perpendicular to the common plane is smaller than the thickness of the tabs in the direction perpendicular to the common plane. Thus, an upper surface of the tabs may be lower than an upper surface of the longitudinal member. When a bond wire is bonded to the upper surface of the tab the bond wire does not protrude beyond the upper surface of the longitudinal member. This protects the bond wire from mechanical influences which may be exerted from a cover on the upper surface of the conductor plate. Due to the intervals between the plurality of longitudinal members, slots between the longitudinal members are constituted. During a thermal runaway of a battery cell gas and flame released from the battery cell can be exhausted via these slots. This may help to avoid heating-up of neighboring cells and a cell propagation.

According to example embodiments, each longitudinal member includes one or more fixing holes for fixing the longitudinal member to a frame of the vehicle battery module. The holes are arranged perpendicular to the common plane. Fastening devices, e.g. heat stakes, provided at the frame of the vehicle battery module may protrude through the holes for fixing the longitudinal member to the frame of the vehicle battery module. This may improve a vibration resistance of the battery module especially of the bond wire connections between the tabs and battery cells.

According to example embodiments, the longitudinal member has a width extending in a direction perpendicular to the common plane and perpendicular to a direction from the first end to the second end of the longitudinal member. According to this example embodiment, the width of the longitudinal member decreases from the first end to the second end of the longitudinal member, that means the longitudinal has a large width at the first end where the longitudinal member is connected to the base part, and a small width at the second end. As the amount of electrical current flowing through the longitudinal member increases from the second end to the first end, this tapered form of the longitudinal member may achieve a constant current density and a minimum of material may be used which reduces the weight of the conductor plate.

Furthermore, according to example embodiments, the conductor plate includes a connector flange part extending from an edge of the base part perpendicular to the common plane. The connector flange part may be used for electrically connecting the conductor plate to a conductor plate of other vehicle battery modules or to a control unit providing electrical energy from the conductor plate to an electrical engine of the vehicle. Arranging the connector flange part in general perpendicular to the common plane helps to increase a stability of the conductor plate. The base part, the plurality of longitudinal members, the tabs and the connector flange part may be integrally formed by pressing or punching.

According to example embodiments, a vehicle battery module for accommodating a plurality of longitudinal battery cells is provided. The battery cells are arranged in parallel with respect to their longitudinal axes and each battery cell has a first end and an opposite second end with respect to its longitudinal axis. The battery module includes a conductor plate adapted to electrically couple the first ends of the battery cells. The conductor plate includes a base part and a plurality of longitudinal members. Each of the longitudinal members includes a first end and a second end, and the first ends of the longitudinal members are connected to the base part. The base part and the plurality of longitudinal members are substantially arranged in a common plane. The longitudinal members are arranged spaced from each other such that an interval between two of the plurality of longitudinal members matches to an interval between two rows of the battery cells.

The battery cells may have a cylindrical shape having a first electrical terminal of a first polarity at the first end and a second electrical terminal of a second polarity at the second end. The first electrical terminal may be a positive electrical terminal and the second electrical terminal may be a negative electrical terminal. According to example embodiments, the battery cells may have any other shape, e.g., a prismatic or a polygonal shape and an opposite polarity.

The spacing between the longitudinal members provides a channel for dissipating gas and heat from a battery cell during a thermal runaway. Thus, a cell propagation as mentioned above can be avoided. Furthermore, the spacing between the longitudinal members may be optimized for a wire-bonding tool for connecting the longitudinal members to the first ends of the battery cells which contributes to an automated production of the battery module.

According to example embodiments, the vehicle battery module includes a battery frame adapted to receive the first ends of the battery cells. According to this example embodiment, the conductor plate is molded into the battery frame of the vehicle battery module. By molding the conductor plate at least partly into the battery frame, a rigidity of the conductor plate as well as the battery frame can be increased.

According to example embodiments, each longitudinal member includes a plurality of tabs. Each tab extends from the corresponding longitudinal member in the common plane in a direction perpendicular to a direction from the first end to the second end of the corresponding longitudinal member. The tabs of one longitudinal member are arranged in an interval matching to an interval of the battery cells of one row. Wire bonds are bonded on one side to the tabs and on the other side to the first ends of the battery cells. By use of the tabs, a length of the wire bonds can be minimized, thus reducing a resistance of the wire bonds and a total amount of lost energy due to the resistance of the wire bonds. Furthermore, each of the wire bonds may be dimensioned such that the wire bond fuses when a predetermined electrical current flowing from the first end of the corresponding battery cell through the wire bond to the conductor plate exceeds a predetermined current. Thus, the wire bond acts as a fuse for individually protecting each battery cell from an over-current which may lead to an overheating or explosion of the battery cell.

According to example embodiments, the vehicle battery module includes a further conductor plate, a cooling plate, and a thermal layer. The further conductor plate is adapted to electrically couple the second ends of the battery cells. The cooling plate is thermally coupled to the further conductor plate and the thermal layer is sandwiched between the further conductor plate and the cooling plate. The thermal layer may include an electrically insulating material. Furthermore, the thermal layer may include a thermally conducting material. As described above, the second ends of the battery cells may provide the negative electrical terminal of the battery cells. In commonly used battery cells, heat of the battery cells generated in operation or during charging the battery cells flows best through the negative end of the cell surface which is the second end of the cell. Therefore, it is highly desirable to align many parallel groups of battery cells in the same plane and attach a single preferably liquid cooled cooling plate to the negative ends of the cells. However, this location is also optimal for electrical connection with the further conductor plate. Incorporating the cooling function into the further conductor plate with a common liquid cooling may cause a short circuit across parallel connected in serious. Even if sections of the liquid cooled cooling plate below each parallel group were electrically isolated, a charge flowing through the plate might cause corrosion through ionization of the liquid, leading to a severe reduction in cooling system performance. Therefore, according to the example embodiment described above, the further conductor plate is electrically coupled to the negative ends of the battery cells, and the cooling plate is thermally coupled to the connector plate and electrically isolated from the conductor plate via the thermal layer sandwiched between the further conductor plate and the cooling plate. For further improvement of the thermal contact between the battery cells and the further conductor plate, a graphite foil may be sandwiched between the negative ends of the battery cells and the further conductor plate. The graphite foil may include a plurality of holes, wherein each hole is arranged in vicinity of the second end of a corresponding one of the battery cells. The second ends of the battery cells may be coupled to the further conductor plate via bond wires extending through the holes of the graphite foil.

The above-described exemplary embodiments will now be described in more detail with reference to the accompanying drawings.

DETAILED DESCRIPTION

Figure 1:
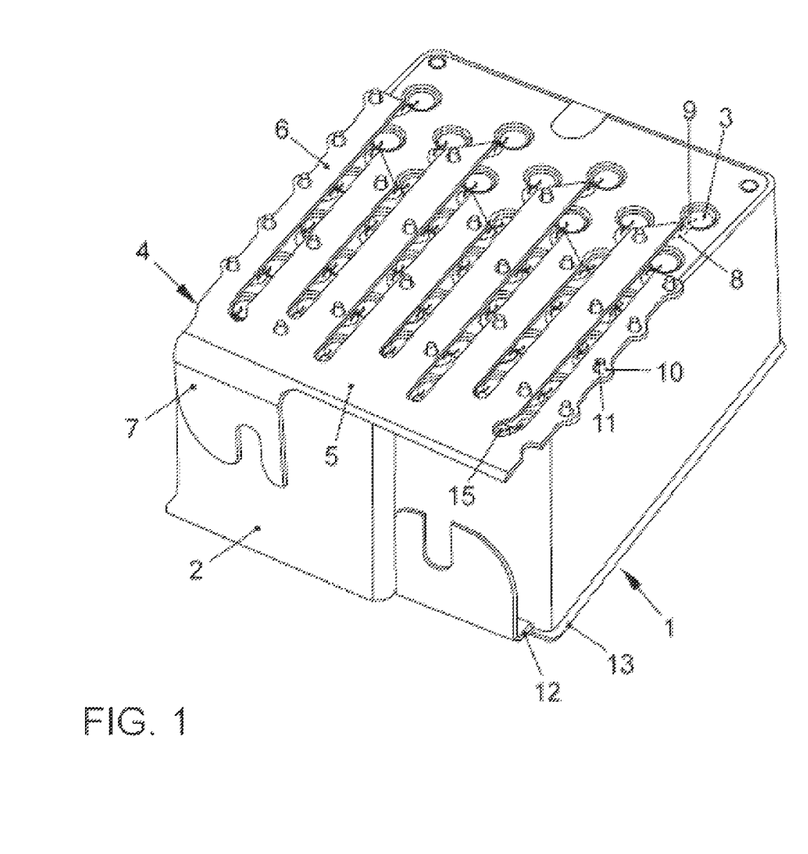
FIG. 1 schematically illustrates a perspective view of a vehicle battery module according to an example embodiment of the present invention.

FIG. 1 schematically illustrates a perspective view of a vehicle battery module 1. The vehicle battery module 1 includes a frame 2 for supporting a plurality of cylindrical battery cells 3. The battery cells 3 are arranged in parallel with respect to their longitudinal axes. Each battery cell 3 includes a first end, which is shown in FIG. 1 at the upper side, and a second end which is not visible in FIG. 1 and which is arranged at the lower end of the battery frame 2. The first end may include a positive electrical terminal of the battery cell 3 and the second end may include a negative electrical terminal of the battery cell 3. In the present context, the terms "upper end" and "first end" are used synonymously, and the terms "lower end" and "second end" are also used synonymously. However, the directional terms "upper" and "lower" relate only to the exemplary embodiment shown in FIG. 1 and do not restrict an orientation of the battery cells or the battery module as they are built in a vehicle. For example, the battery module 1 may be built in a vehicle in any direction as needed by the application. Furthermore, in FIG. 1 the battery module 1 includes 39 battery cells. However, in other example embodiments, the battery module 1 may include any other number of battery cells 3.

At the upper side of the battery frame 2 a conductor plate 4 is arranged. The conductor plate 4 includes a base part 5, eight longitudinal members 6, and a connector flange part 7. The longitudinal members 6 are connected at one end to the base part 5. The base part 5 and the longitudinal members 6 are arranged in a common plane along the upper surface of the battery frame 2. The connector flange part 7 extends from an edge of the base part 5 perpendicular to the common plane of the base part 5 and the longitudinal members 6 along a side surface of the battery module 2. Along a longitudinal edge of the longitudinal members 6 a plurality of tabs 8 are arranged. The tabs 8 may be integrally formed with the longitudinal members 6. Each battery cell 3 is assigned one tab 8 and each battery cell 3 is electrically connected to the assigned tab 8 via a wire bond 9. The tabs 8 for the battery cells 3 of each row arranged nearest to the side of the battery frame 2 where the connector flange part 7 is located, are formed as indentations 15 in a spacing between two longitudinal members 6. The base part 5 and the longitudinal members 6 furthermore include several holes 10 for securing the conductor plate 4 to the battery frame 2. Securing the conductor plate 4 may be accomplished by protrusions 11 of the battery frame 2 protruding from the battery frame 2 through the holes 10. The protrusions may include, e.g., so-called heat stakes or clips or snaps or any other fastening or capturing device. Securing the conductor plate 4 at several points as shown in FIG. 1 improves a vibration resistance of the battery module 1. Furthermore, the conductor plate 4 may be molded partially or completely into the upper surface of the battery frame 2.

Figure 2:
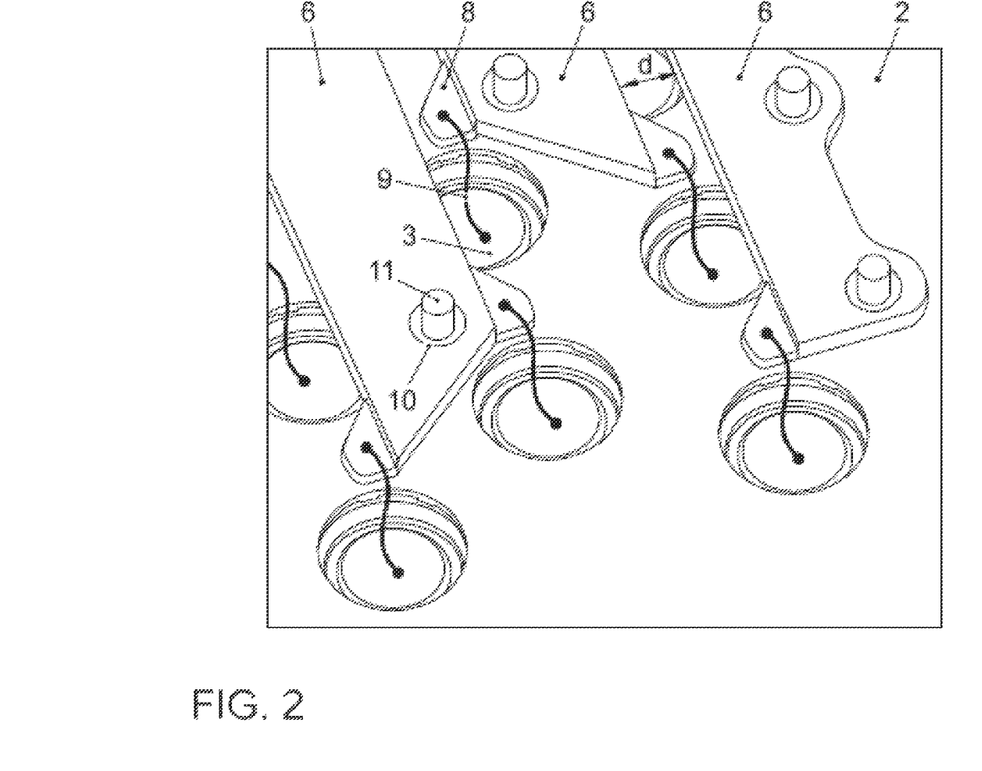
FIG. 2 shows an enlarged partial view of the vehicle battery module of FIG. 1.
Figure 6:
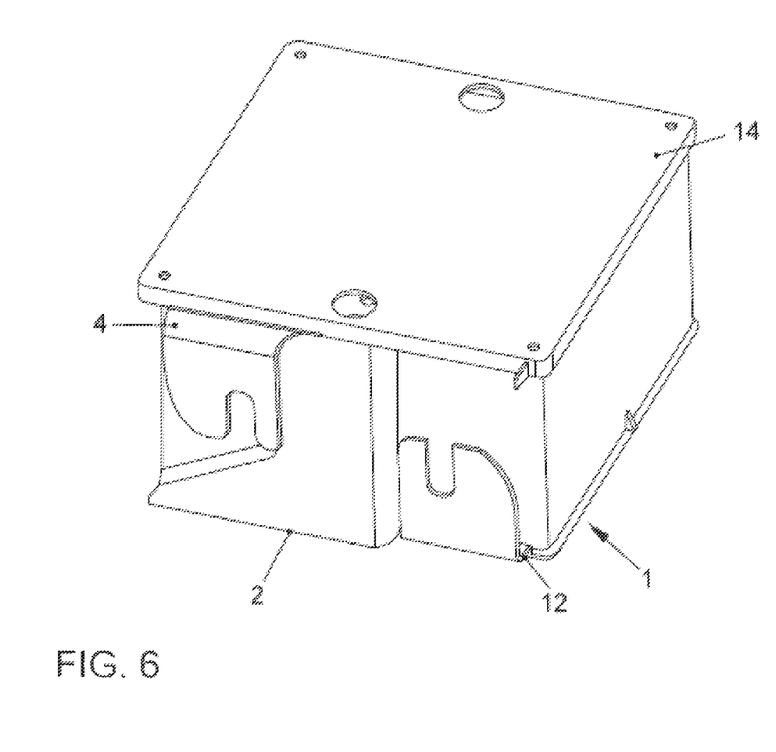
FIG. 6 shows a perspective view of the vehicle battery module of FIG. 1 in connection with a top cover.

FIG. 2 shows the tabs 8 of the longitudinal members 6 and the wire bonds 9 between the tabs 8 and the battery cells 3 in more detail. The battery cells 3 are arranged standing upright in parallel in the frame 2. The upper ends of the battery cells 3 are exposed via openings in the upper surface of the frame 2. The longitudinal elements 6 or fingers 6 are arranged on the upper surface of the frame 2 and fixed to the frame 2 with heat stakes 11 extending through the holes 10. Each battery cell 3 is assigned a corresponding tab 8. A distance d between two longitudinal members 6 may be optimized for a wire-bonding tool for providing a secure access of the wire-bonding tool to the tab 8 and the first end of the battery cells 3. As shown in FIG. 2, a thickness of the tab 8 is smaller than a thickness of the longitudinal element the tab 8 is extending from. Thus, an upper surface of the tab 8 is deepened or recessed with respect to the upper surface of the corresponding longitudinal element 6. The wire bond 9 is connecting the tab 8 and the upper end of the battery cell 3. A first end of the wire bond 9 is bonded to the upper surface of the tab 8 and the other end of the wire bond is bonded to an upper surface of the upper end of the battery cell 3. Preferably, the wire bond 9 is also adapted to serve as a fuse for the battery cell 3. As the tab 8 is recessed the wire bond 9 is protected from mechanical influences at the upper side of the battery module 1. The upper side of the battery module 1 can be covered with a battery cover 14 as shown in FIG. 6.

Figure 7:
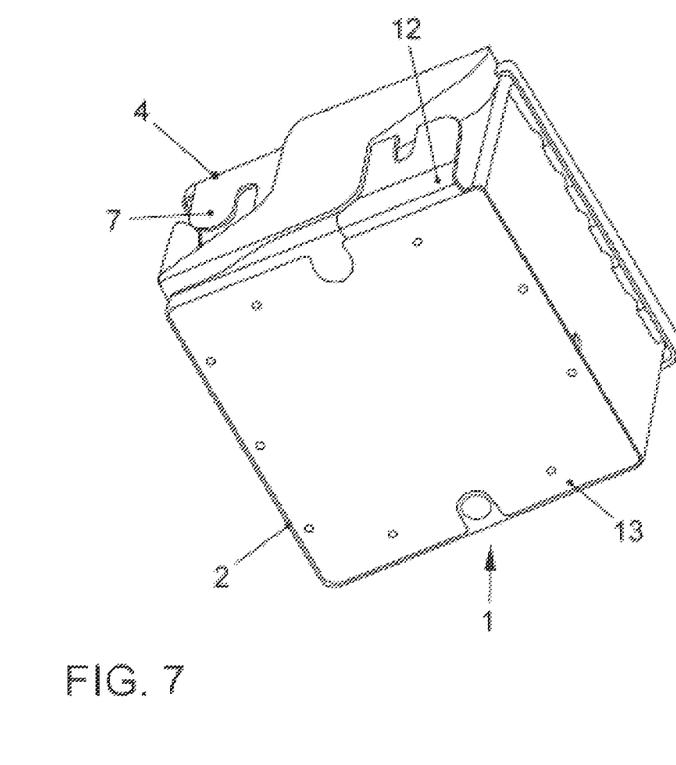
FIG. 7 shows a perspective bottom view of the vehicle battery module of FIG. 1 in connection with a bottom cover.

Returning to FIG. 1 at the lower end of the battery module 1 a further conductor plate 12 is partly visible for connecting the lower ends of the battery cells 3. The lower ends of the battery cells 3 can also be connected to the further conductor plate 12 via wire bonds, but the wire bonds on the lower side may not be adapted to act as a fuse. The further conductor plate 12 on the lower side is adapted to transfer thermal losses of the battery cells 3 to a cooling system. Therefore, a cooling plate 13 is thermally connected to the further conductor plate 12 at the lower side of the further conductor plate 12. A thermal layer sandwiched between the further conductor plate 12 and the cooling plate 13 electrically insulates the cooling plate 13 from the further conductor plate 12 and allows at the same time heat to flow from the battery cells 3 to the cooling plate 13. The terminals at the lower ends of the battery cells 3 may be electrically connected to the further conductor plate 13 via a graphite foil. The graphite foil spares out a center part of each battery cell 3 to allow additional electrical connection, e.g., a bond wire, from the battery cell 3 to the further conductor plate 13. FIG. 7 shows the lower side of the battery module 1 in more detail.

Figure 3:
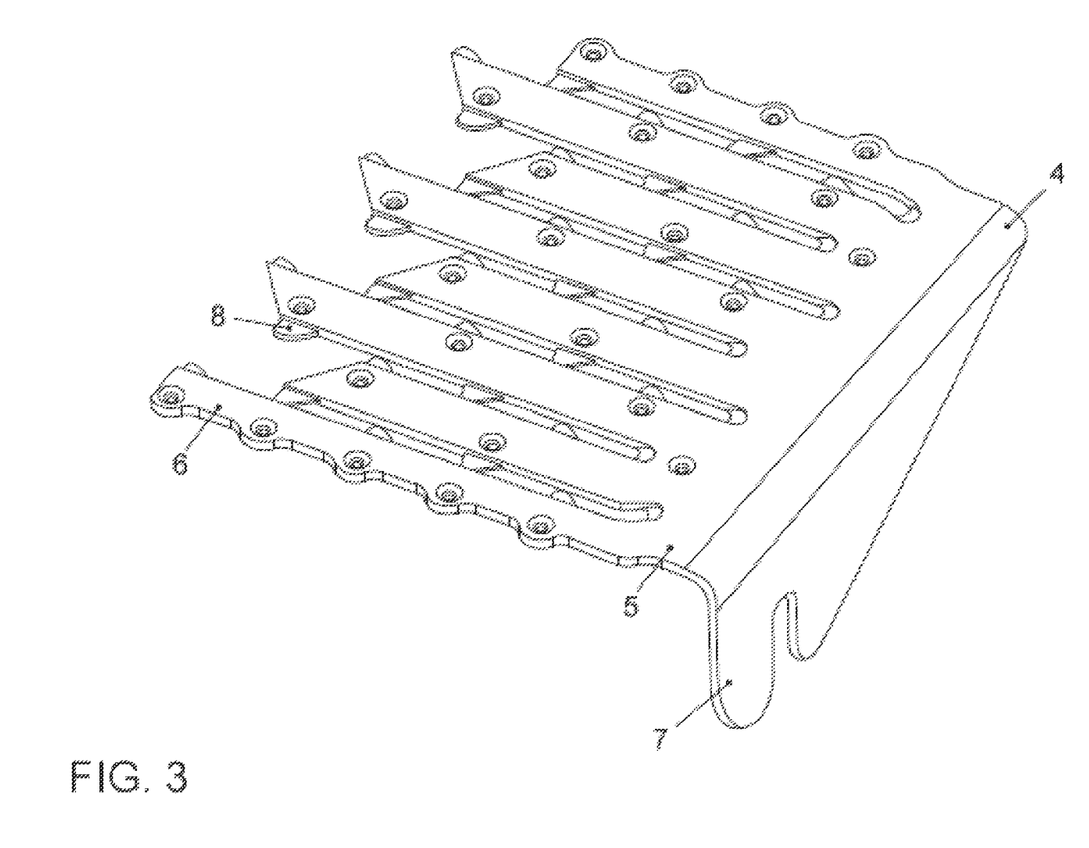
FIG. 3 schematically illustrates a perspective view a conductor plate according to an example embodiment of the present invention.

FIG. 3 shows a perspective view of the conductor plate 4 in an un-mounted state. As shown in FIG. 3, the longitudinal members 6, the base part 5, the flange part 7, and the tabs 8 are formed integrally from a metal sheet, e.g., by punching and pressing. However, the conductor plate 4 may be produced in any other manner, e.g., by welding or casting.

Figure 4:
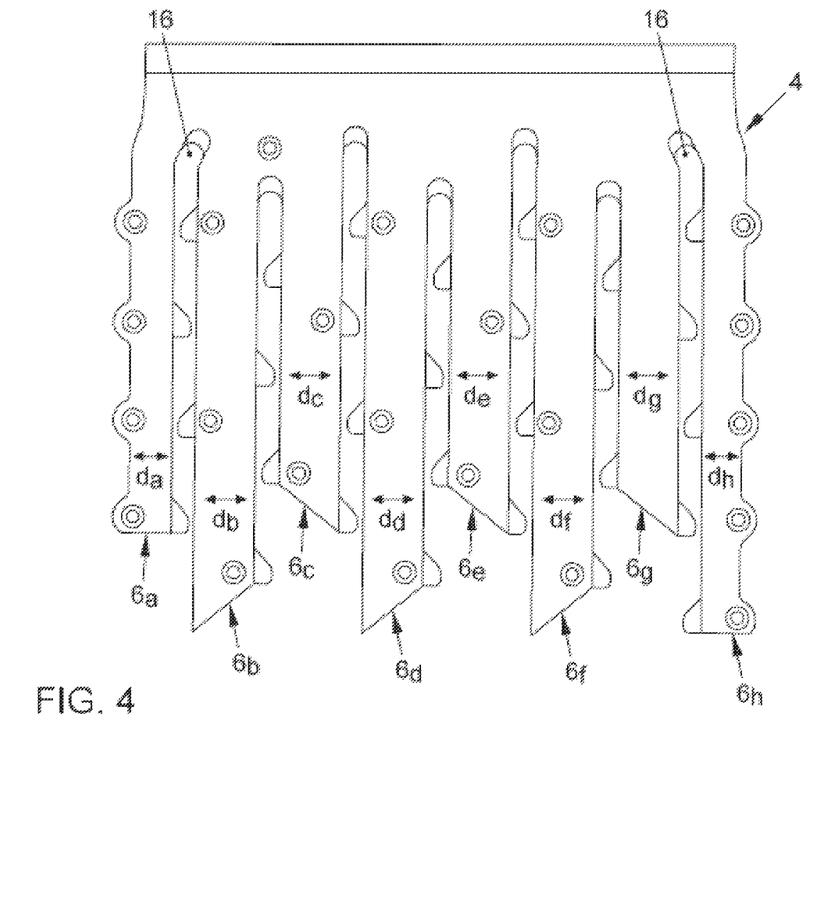
FIG. 4 shows a top view of the conductor plate of FIG. 3.
Figure 5:
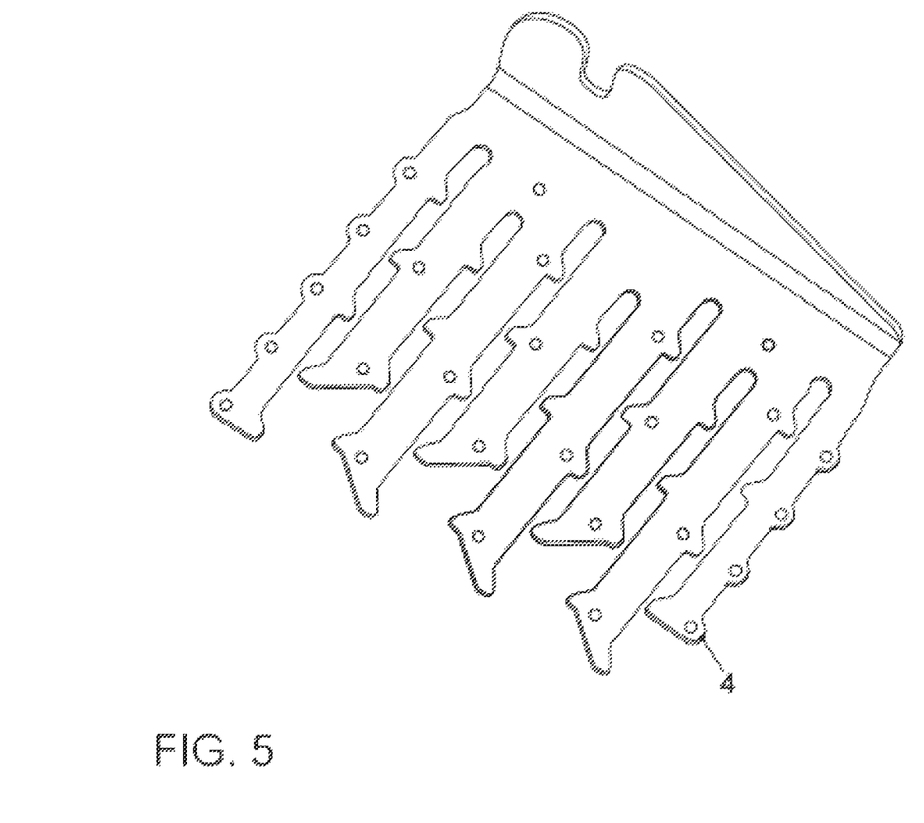
FIG. 5 shows a perspective bottom view of the conductor plate of FIG. 3.

FIG. 4 shows a top view of the conductor plate 4 and FIG. 5 shows a perspective bottom side view of the conductor plate 4. In FIG. 4, for each of the longitudinal members $6a$ to $6h$ a width $d_a$ to $d_h$ is indicated. As can be seen from the number of tabs 8 provided at each of the longitudinal members 6, an electrical current transferred in the central longitudinal members $6b$ to $6g$ is higher than an electrical current transferred in the edging longitudinal members $6a$ and $6h$. For achieving a constant current density in each of the longitudinal members 6, the width $d_a$ and $d_h$ of the edging longitudinal elements $6a$ and $6h$ is smaller than the width $d_b$ to $d_g$ of the central longitudinal members $6b$ to $6g$. Thus, a constant current density using less material resulting in a lower weight can be achieved.

Figure 8:
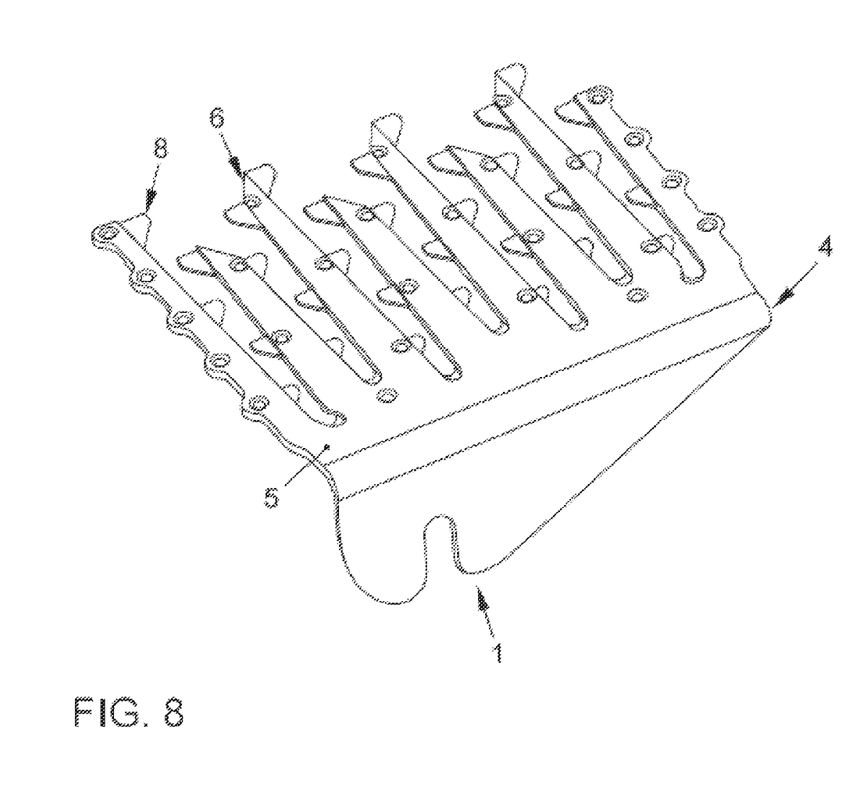
FIG. 8 schematically illustrates a perspective view of a conductor plate according to an example embodiment of the present invention.
Figure 9:
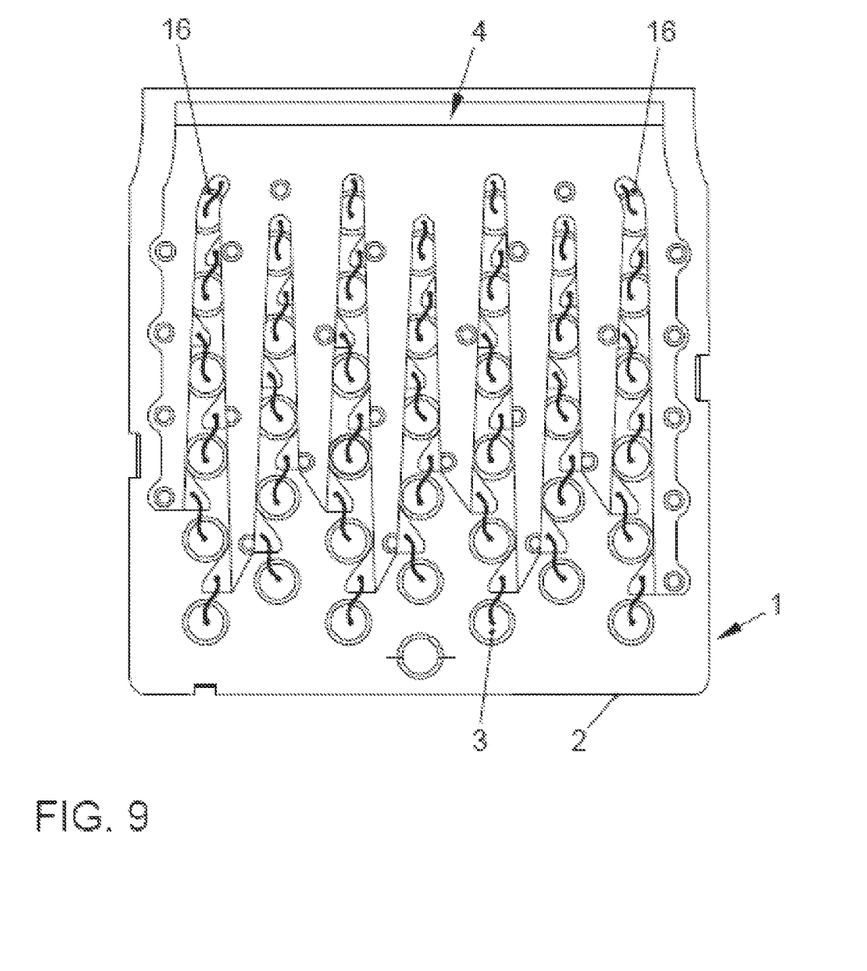
FIG. 9 shows a top view of the conductor plate of FIG. 8 in an assembled state in a vehicle battery module.

Furthermore, as shown in FIG. 8, the longitudinal members 6 can be tapered which means that the width of each of the longitudinal members 6 is decreasing from the first end where they are connected to the base part 5 to the opposite end. The tapered longitudinal members 6 are even more optimized for a more constant current density using less material. FIG. 9 shows the conductor plate 4 of FIG. 8 in a state mounted to a frame 2 of a battery module 1.

As can be seen from the top view FIGS. 4 and 9, the bases 16 of the spaces between the longitudinal members 6 can be angled to improve current flow and avoid local concentrations of electrical current.

While exemplary embodiments have been described above, various modifications may be implemented. For example, the connector flange part 7 may also be tapered to improve current density with minimal weight. Furthermore, the slot configuration of the parallel longitudinal members 6 may be used in combination with the cover 14 to provide a pathway or channel for gas and heat to escape from the battery cells in case a thermal runaway of battery cell 3.

What is claimed is:

1. A vehicle battery module for accommodating a plurality of longitudinal battery cells, the battery cells arranged in parallel with respect to their longitudinal axes, each battery cell having a first end and an opposite second end with respect to its longitudinal axis, comprising:
    a conductor plate adapted to electrically couple the first ends of the battery cells, the conductor plate including:
    a base part, and
    a plurality of longitudinal members, each longitudinal member including a first end and a second end, the first ends of the longitudinal members being connected to the base part, the base part and the plurality of longitudinal members being substantially arranged in a common plane;
    wherein the longitudinal members are arranged spaced from each other such that an interval between two of the plurality of longitudinal members matches to an interval between two rows of the battery cells.

2. The vehicle battery module according to claim 1, wherein the conductor plate is molded into a battery frame of the vehicle battery module, the battery frame being adapted to receive the first ends of the battery cells.

3. The vehicle battery module according to claim 1, wherein the first end of each of the battery cells is connected to the conductor plate via a corresponding wire bond.

4. The vehicle battery module according to claim 3, wherein each longitudinal member includes a plurality of tabs, each tab extending from a corresponding longitudinal member in the common plane and in a direction perpendicular to a direction from the first end to the second end of the corresponding longitudinal member, the tabs of one longitudinal member being arranged in an interval matching to an interval of the battery cells of one of the rows, and wherein the wire bonds are bonded to the tabs.

5. The vehicle battery module according to claim 3, wherein each of the wire bonds is dimensioned such that the corresponding wire bond fuses when a predetermined electrical current flowing from the first end of the corresponding battery cell through the wire bond to the conductor plate exceeds a predetermined current.

6. The vehicle battery module according to claim 1, further comprising:
    a further conductor plate adapted to electrically couple the second ends of the battery cells;
    a cooling plate thermally coupled to the further conductor plate; and
    a thermal layer sandwiched between the further conductor plate and the cooling plate.

7. The vehicle battery module according to claim 6, wherein the thermal layer includes an electrically insulating material.

8. The vehicle battery module according to claim 6, wherein the thermal layer includes a thermally conducting material.

9. The vehicle battery module according to claim 6, further comprising a graphite foil sandwiched between the second ends of the battery cells and the further conductor plate.

10. The vehicle battery module according to claim 9, wherein the graphite foil includes a plurality of holes, each hole being arranged in a vicinity of the second end of a corresponding one of the battery cells, wherein the second ends of the battery cells are coupled to the further conductor plate via bond wires extending through the holes of the graphite foil.

11. The vehicle battery module according to claim 6, wherein the thermal layer includes an electrically insulating and thermally conducting material.

12. The vehicle battery module according to claim 1, wherein the battery cells have a cylindrical shape and an electrical terminal of a first polarity at the first end and an electrical terminal of a second polarity at the second end.

* * * * *